United States Patent [19]

Renk et al.

[11] Patent Number: 4,470,324
[45] Date of Patent: Sep. 11, 1984

[54] GEAR CASE

[75] Inventors: Richard J. Renk; George E. Boller, both of Winona, Minn.

[73] Assignees: Carol A. Mackay; Helen L. Kurtz, both of Winona, Minn.

[21] Appl. No.: 312,534

[22] Filed: Oct. 19, 1981

[51] Int. Cl.³ .............................................. F16H 57/02
[52] U.S. Cl. .................................... 74/606 R; 74/467; 277/67
[58] Field of Search .................... 74/467, 606 R, 609; 277/67, 152, 153, 184, 53; 384/103, 403

[56] References Cited

U.S. PATENT DOCUMENTS

| | | | |
|---|---|---|---|
| 2,438,020 | 3/1948 | Rambo et al. | 74/606 |
| 3,167,969 | 2/1965 | Dilworth et al. | 74/467 |
| 3,276,289 | 10/1966 | Cox | 74/606 |
| 3,281,190 | 10/1966 | Cox | 384/151 |
| 3,710,646 | 1/1973 | Bogan | 74/609 X |
| 4,347,759 | 9/1982 | Renk et al. | 74/467 X |

Primary Examiner—Kenneth Dorner
Assistant Examiner—Frank McKenzie
Attorney, Agent, or Firm—Richard J. Renk

[57] ABSTRACT

A lubricant retaining device for use with a gear case having a pair of matable sections with a shaft receiving opening therein. The lubricant retaining device extends inwardly to the interior of said case to reduce lubricant flow through the shaft receiving opening.

19 Claims, 18 Drawing Figures

FIG.16 a# GEAR CASE

BACKGROUND OF INVENTION

The present invention relates to the retaining of lubricant in gear cases and more particularly to the retaining of lubricant in traction motor gear cases such as found in diesel and electric locomotives and generally shown in U.S. Pat. No. 3,710,646.

Gear cases of this type include a pair of matable sections which can be nested about the pinion, bull gear, axle and shafts associated with the driving of locomotive wheels to provide an enclosure for the retention of lubricant.

Because of the critical nature of the gear case, it is important to retain the lubricant in the case and keep dirt, brake shoe dust, water and other contaminants out. However, up to this time, it has been difficult to retain lubricants because of the many variables involved such as the lateral movement of the locomotive axle relative to the traction motor and its attached gear case, because of extreme vibration transmitted through the wheels and axles, and because of the characteristics of the lubricants necessary for proper lubrication of the gears (which often times include chunks of polyethylene bag materials and the like).

SUMMARY OF INVENTION

The present invention provides an arrangement wherein lubricant is restricted in its flow outwardly of the gear case. This is accomplished by the use of a device which extends inwardly from a side(s) of the gear case in shielding relation between a gear and a rotatable surface in the case. The device restricts the flow of lubricant toward the rotatable surface while at the same time the device is not susceptible to plugging so as to become inoperable because of additives and foreign matter in the lubricant.

PREFERRED EMBODIMENTS

In the drawings, the invention will be described with specific reference to locomotive traction motor gear case but it is of course not limited thereto.

Figure 1:
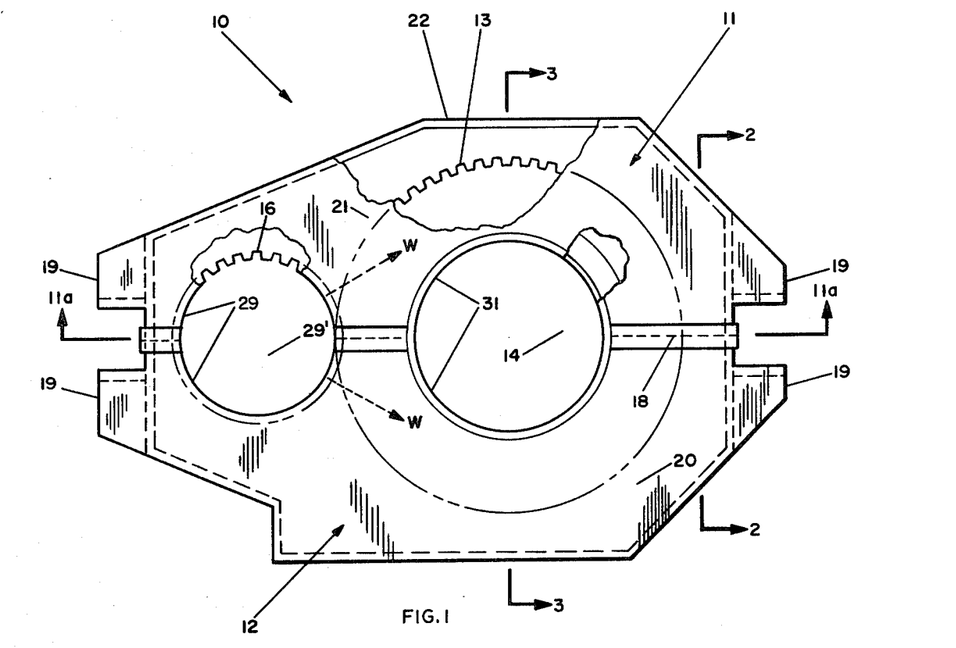
FIG. 1 is a side elevation of gear case with the concepts of the invention included therein.
Figures 3, 4, 5:
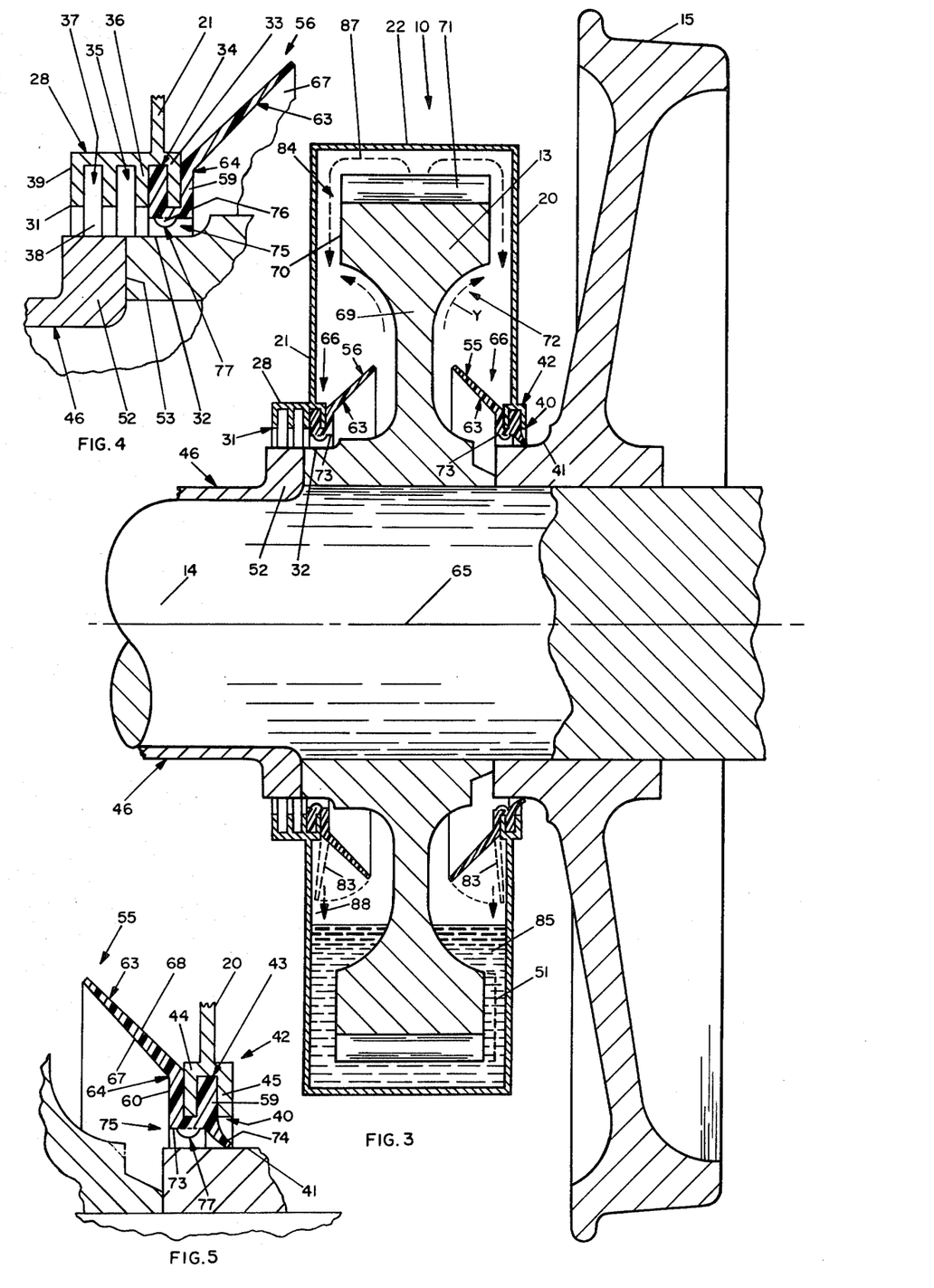
FIG. 3 is a vertical sectional view of the gear case showing the lubricant retaining devices relative to a locomotive axle, wheel, bull gear, and traction motor support bearing taken generally along lines 3—3 of FIG. 1.
FIG. 4 is an exploded partial sectional view of the motor or inboard side lubricant retaining device shown in FIG. 3 taken generally at the 12:00 o'clock position of the device.
FIG. 5 is an exploded sectional view of the wheel side lubricant retaining device taken generally at the 12:00 o'clock position of the device.

As shown in FIGS. 1, a typical gear case 10 comprises a pair of matable sections including an upper or top section 11 and a lower or bottom section 12 which encase movable parts such as a conventional bull gear 13 (carried by an axle 14) and driving pinion gear 16 (FIG. 1). The gears and axle in turn drive wheel(s) 15 (FIG. 3).

Figure 2:
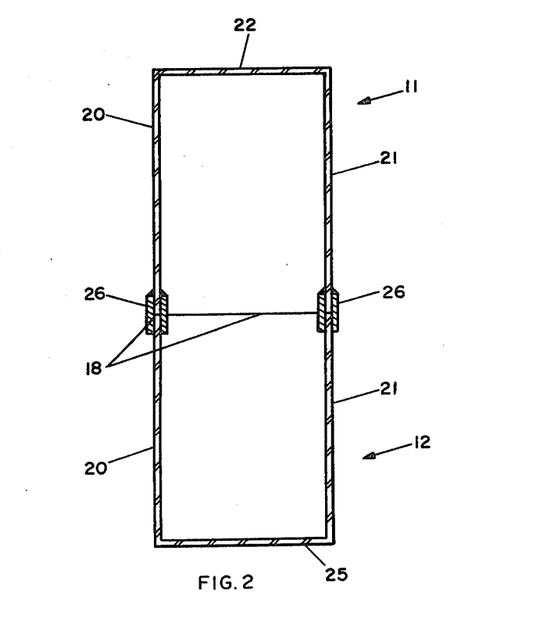
FIG. 2 is a sectional view of the gear case along lines 2—2 of FIG. 1 showing how a tongue and groove arrangement is used along the mating split-line of the respective halves of the gear case.

The sections 11 and 12 are somewhat similar in shape and mate at a split-line indicated at 18 (FIG. 2) to provide a unitary structure. Brackets 19 at their ends are used to clamp the sections 11 and 12 mating relationship to supporting arms of a traction motor (not shown). As shown in FIG. 2, the upper gear case section 11 includes sides 20 and 21 and a top wall 22 having a series of angularly disposed areas. The lower section has somewhat similar sides 20 and 21 and a bottom 25 with several angularly disposed areas.

The gear case sections 11 and 12 are kept in alignment with respect to one another along the split-line 18 by metal strips 26 welded along the top sides 20 and 21. The strips 26 overhang the split-line 18 and help provide a groove area into which the split-line edge of the lower section 12 nests.

The gear case side wall 20 is provided with a semi-circular cutout 29 (FIG. 1) in both the top 11 and bottom 12 which align with one another to provide a circular passage to the inside of the case through which a traction motor pinion drive shaft 29' may pass. The gear case sidewall 20 also has two larger semi-circular cutouts 31 in the top and bottom halves 11 and 12 which align with one another to provide a circular passage through which a rotating shaft surface such as a gear hub 32 (FIG. 3) to be discussed later may pass. As shown in FIG. 4 the gear hub cutouts 31 are defined by a holding means which may include a multi-grooved semi circular channel 28, having in successive order, a relatively thin inner wall 33, a slot or groove 34, a middle slot 35 separated from the inner slot by a wall 36, and an outer slot 37 separated from the middle slot by a wall 38, and an outer wall 39. All of the slots face the hub 32 or in other words open radially inwardly.

On the opposite or wheel side of the gear case (FIGS. 3 and 5), there is a circular cutout or passage 40; this is formed by two semi-circular cutouts or recesses in side 20. The passage 40 allows a rotary member such as shaft surface or a wheel hub 41 (to be discussed later) to extend into the interior of the case. As shown in FIG. 5, the cutout 40 is defined by a holding means which may include a channel 42 (semi-circular) having a slot or groove 43 defined between a relatively thin inner wall 44 and an outer wall 45.

The present invention is primarily concerned with retaining the gear lubricant within the gear case 10 and inwardly of the sides 20 and 21 by means of lubricant retaining devices 55 and 56 to be discussed later. However, for purposes of explanation, as is common practice in gear cases of the type shown, the slot 37 (FIG. 4) of the channel holder 28 overlies the support bearing flange 52 (which is non-rotating). A static dust seal (not shown) of felt or the like is ordinarily carried in the slot 37 and engages the flange 52. In most gear case applications, nothing is used in the center slot 35 which generally has a drain (not shown) through which excess support bearing oil passing through the bearing 46 and gear lubricant escaping the case may drain. It is of course one of the primary purposes of the present invention to keep gear lubricant from entering the slot 35 or getting to the lip 74 on the wheel side (to be discussed later).

The various circular cutouts or passages provide communication between the inside and the outside of the case through which movable members such as those having shaft-like surfaces or areas may extend such as the gear hub 32 and the wheel hub 41. It is through these passages that lubricant may leak from the case and/or dirt and water may enter the case.

Detailed reference is now made to FIG. 3 showing the gear case relative to the locomotive bull gear 13, axle 14, wheel 15, and traction motor suspension bearing 46.

The traction motor (not shown) drives the pinion gear 16 (FIG. 1) which in turn drives the bull gear 13 and consequently the axle 14 and wheels 15. The axle rotates in the suspension bearing 46 which is held by the traction motor; the gear case 10 is bolted to the traction motor through the brackets 19 (FIG. 1). In practice, the traction motor is designed to allow for lateral or axial movement of the axle 14 in the suspension bearings 46.

Since the gear case 10 is fixed with respect to the traction motor and the suspension bearing 46, the bull gear 13 may move laterally to the position indicated by the dotted line 51 (FIG. 3). This lateral movement may be between 1/16" and 5/16". The same movement will also appear between the flange 52 of the suspension bearing 46 and the gear hub thrust face 53.

It is this lateral movement between the gear case 10 and the rotating gear 13 (carried by the axle) which has made it extremely difficult to keep lubricants in the gear case because of the pumping action and pressures on the gear lubricants within the case. In service, even under reasonable speeds, the lateral oscillations can be 30 to 90 cycles per minute. With a locomotive traveling 12,000 to 20,000 miles per month, the lubricant losses can be quite high and require numerous time-consuming and costly refilling stops.

Figures 6, 7, 8, 9:
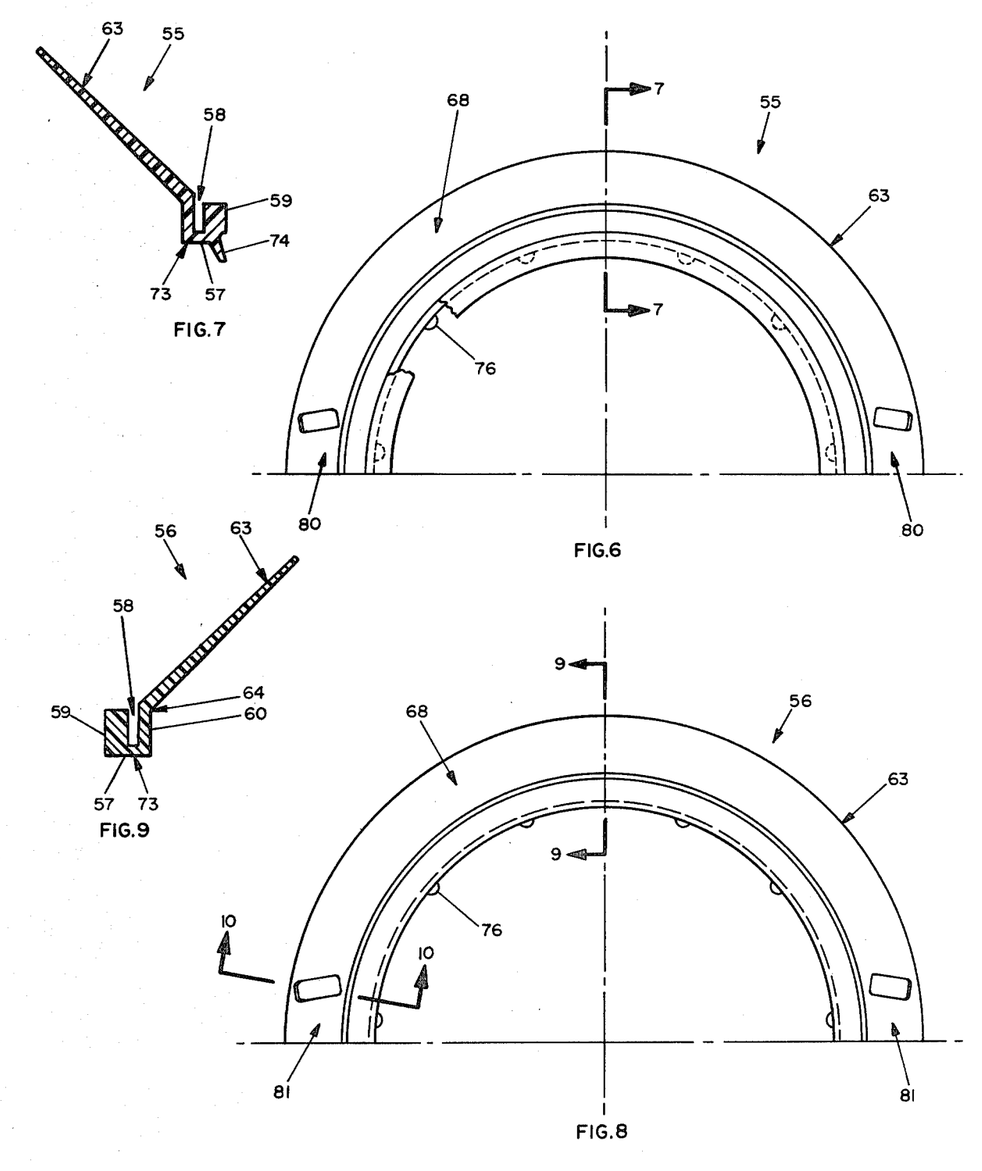
FIG. 6 is a side elevation of a wheel side lubricant retaining device.
FIG. 7 is a sectional view of the wheel side device taken along lines 7—7 of FIG. 6.
FIG. 8 is a side elevation of a motor side lubricant retaining device.
FIG. 9 is a sectional view of the motor side lubricant retaining device taken along lines 9—9 of FIG. 8.
Figure 10:
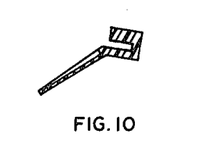
FIG. 10 is a sectional view of the motor side lubricant retaining device taken along lines 10—10 of FIG. 8 showing a relieved area which may nest over a projecting area in a gear case.

Now, in accordance with the present invention, to reduce lubricant losses from the gear case (and prevent water and dirt entry into the gear case) there are provided sealing means or lubricant retaining devices 55 on the wheel side and 56 on the motor side of the case. The sealing devices 55 and 56 may be molded from a resilient material, such as elastomeric material and may be semi-circular in shape (FIGS. 6–8). Generally, the sealing devices are used on each side of the gear case in pairs with one being carried in the top gear case section 11 and one in the bottom section 12 (FIG. 1) to provide 360° arcuate coverage as will be described later.

Specifically, as shown in FIGS. 6–9, the semi-circular sealing means 55 and 56 have a circumferentially or arcuately extending base 57 with a circumferentially extending slot or groove 58 opening radially outwardly from the base and defined between circumferentially extending outer legs 59 and inner legs 60 which together with slot 58 form a locating means for the lubricant retaining device relative to the sides of the gear case. As shown in FIGS. 3–5, the outer leg 59 is adapted to snap into the inner slot 34 of channel holder 28 or into the slot 43 in the wheel side channel 42. While the outer legs 59 and inner legs 60 of the sealing elements 55 and 56 are shown to be approximately the same size, they may vary depending on the specific application.

In mounting the wheel side sealing device 55, the inner wall 44 of the channel 42 nests in the sealing device slot 58 (FIGS. 5 and 7). In other words, the legs 59 and 60 of the sealing element straddle the inner wall 44 of the cutout channel 42 with the inner leg 60 extending generally adjacent the inside of the gear case. The sealing device may be retained by a slight interference fit by using wedge type projections or by an adhesive.

In mounting the motor side sealing device 56, the slot 58 therein mates with the inner wall 33 (FIG. 4) of channel 28 so that the sealing element legs 59 and 60 straddle the wall 33.

Reference is now made in FIGS. 6–10 for further details regarding the lubricant retaining devices 55 and 56. As shown, the devices are provided with gear lubricant collecting means which may include a web or leaf section 63 extending inwardly from the inner leg 60 toward the inside of the gear case. The web or leaf 63 may be in a generally arcuately or circumferentially oriented truncated conical form. Preferably the leaf or web 63 extends from the outside diameter (indicated at 64) of the inner leg 60 and generally at an angle to the axial centerline 65 (FIG. 3).

The web 63 may be relatively thin and pliant to provide a deflectable collecting means and projects inwardly from a position adjacent the side of a gear case and together with the gear case side provides a somewhat V-shaped trough or channel as indicated at 66 (FIG. 3). In effect, the web 63 diverges radially away or outwardly from the horizontally disposed axial centerline 65 at it extends inwardly into the case and away from the gear case sides 20, 21 etc. In other words, the web has a somewhat frustro-conical shape, spreading wider or enlarging as it progresses away from the gear case sides with its underside 67 (FIG. 5) facing somewhat toward the axial centerline 65 and its upper side 68 facing away from the centerline.

As it extends inwardly, the web 63 may extend toward the gear arm 69 and inwardly under the projection of the sides of the gear rim 70 and teeth 71 to the undercut area 72 (FIG. 3) for a purpose to be described later.

Specific reference in now made to the wheel-side sealing device 55 (FIGS. 3, 5, and 6). For purposes of sealing against the cylindrical wheel hub surface 41, there is provided a lip 74 extending radially inwardly and angularly toward the outside of the gear case from the base 57 and outer leg 59. Lip 74 is formed to have a slightly smaller diameter than the wheel hub surface 41 so as to compressively engage and seal against the hub as shown by the deflection in FIG. 5.

As may be seen in FIG. 3, the wheel hub surface 41 is cylindrical or shaft-like and may extend through the sealing device 55 and into the interior of the gear case. To permit entry into the case, (or in other words to allow the gear case sides 20 to overhang the hub surface), the sealing element base 57 has its lower inner circumferential surface 73 spaced from the hub surface 41 as indicated at 75. That is, the base surface 73 has a larger I. D. than the wheel hub 41. For best results this has been found to be greater than 1/16" and preferably 3/16".

The same spacing of the motor side sealing device 56 relative to the gear hub 32 is desirable so that the gear hub can project under its base 57.

To keep the sealing device base surface 73 away from the wheel hub, and particularly during installation of the gear case halves 11 and 12, there may be provided spacer means in the form of projections or protrusions 76 which extend radially inwardly from the base surface 73 toward the hubs 32 and 41. As shown in FIGS. 6 and 8, the projections are spaced apart circumferentially and may take the shape of small semi-circles or half spheres to provide minimal contact should any of them touch the hub surfaces 32 or 41. Normally, it is desirable to have the projections spaced from the hub surfaces 32 and 41 as shown at 77 in FIGS. 4 and 5 and somewhat in vertical alignment with their slots 58.

If the gear case halves 11 and 12 are shifted with respect to the hub surfaces 32 and 41 during installation, the projections 76 will tangentially bottom or contact the hub(s) thereby somewhat centering the gear case sealing device and also forcing them into nesting engagement with their channels 28 and 42. At the same time, the projections 76 will keep the base 57 of the sealing device base spaced above the hubs as shown at 75 so as not to rub thereon.

Thus it will be evident from FIGS. 4 and 5 that there is preferably no contact (or very minimal contact with the spacer projections 76) between the respective sealing devices 55 and 56 and their related hub surfaces 41 and 32 within the confines of the gear case. The bases 57 are thus interposed between the hubs 41 and 32 and a portion of the gear case channels 28 and 42.

Previous concepts employed felt seals in the channel slots 34 and 43 which engaged the wheel hub and the gear hub generally in line with the vertical sides of the gear case (or offset toward the inside of the case). With lateral movement of the gear case 10 relative to the hubs, the felt seals would act like a scraper or "windshield" wiper and pump the gear lubricants collecting on the hubs to the outside of the case resulting in high losses. Moreover, the rubbing seals would generate heat in the gear hubs which was then transmitted to the lubricant thereby decreasing its viscosity and resulting in even higher losses.

Now, for installation, before the gear case halves 11 and 12 are mounted over the gears 13 and 16, the semicircular sealing devices 55 and 56, which may be pliant and bendable, are inserted in their respective slots 34 and 43 (FIG. 11a) in both the top and bottom halves of the gear case.

Figure 11A:
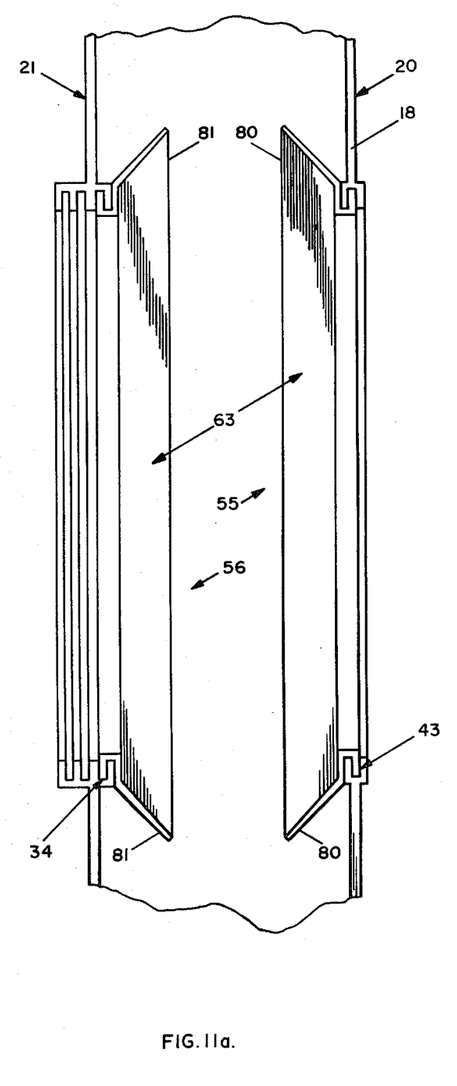
FIG. 11a is a partial plan view of the top half of the gear case taken along lines 11a—11a of FIG. 1 showing the lubricant retaining devics inserted in place.
Figure 11B:
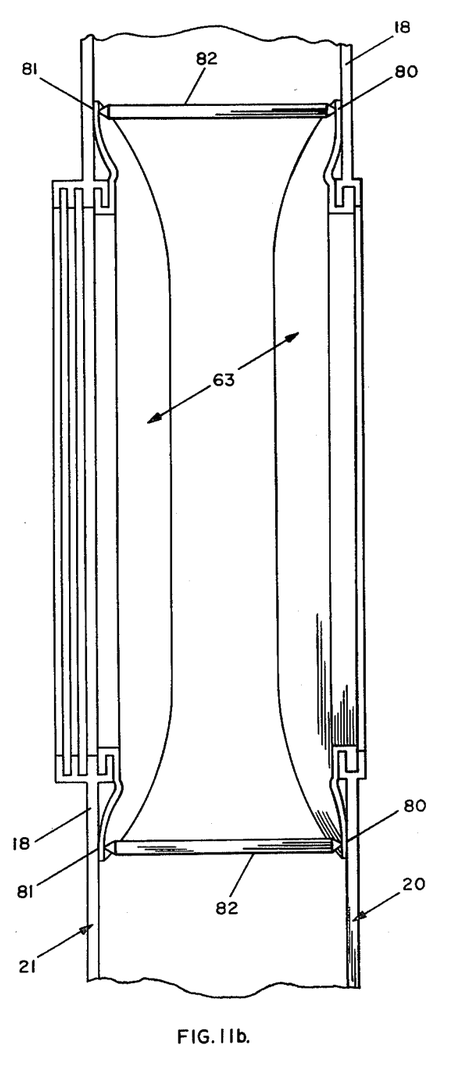
FIG. 11b is a view similar to FIG. 11a but showing how the ends of the lubricant retaining devices are spread back against the sides of the gear case to enable them to slide past and deflect as the gear case half is slid over a driving gear.

Once the sealing devices 55 and 56 have been pressed into position in their respective channel slots 34 and 43 in each gear case half, their ends 80 and 81 of the webs are bent or deflected backwardly against the inside sides of the gear case and held by spreader bars 82 (11b) adjacent the gear case split line 18. The spreader bars may be pointed and dig into and hold them in contact with the webs. By having the ends 80 and 81 held against the sides of the gear case, the case halves 11 and 12 with the sealing devices can be installed over the gear 13 shown in FIG. 11c with the deflected ends providing a "lead in" effect so that the ends will not stub or catch on the gear teeth 71.

Figure 11C:
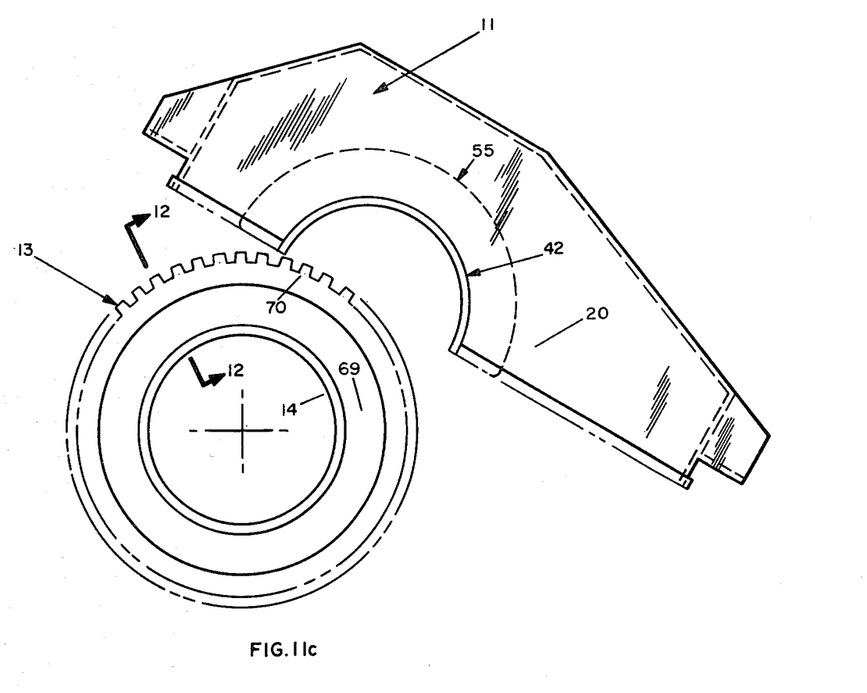
FIG. 11c is a view showing how a gear case half with the lubricant retaining device in place is tilted to start one end of the device sliding past a gear.
Figure 12:
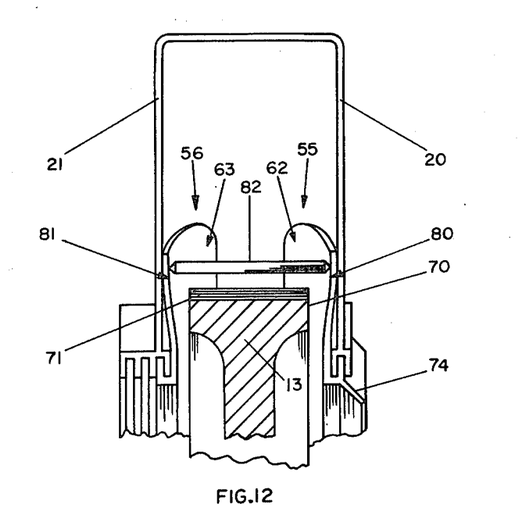
FIG. 12 is a partial sectional view looking in the direction 12—12 of FIG. 11c showing how the spread apart lubricant retaining devices slide past a gear during assembly.

To start a gear case half over the gear 13, one end of the gear case half is tilted upwardly as shown in FIG. 11c and the deflected ends 80 and 81 straddles the gear rim 70 and teeth 71 as shown in FIG. 12. The deflected ends thus act as a starter to lead and cause the remainder of the sealing devices 55 and 56 to deflect, fold and compress against the sides of the gear case half as the case is moved over the gear.

As a gear case half is gradually slid over the gear 13 and the deflected ends 80 and 81 straddle the gear teeth 71, the spreader bar 82 engages the gear teeth and is kicked out of contact with the deflected ends 80 and 81. Continued movement of the case over the gear gradually deflects and compresses the sealing device webs 63 against the case sides as shown by the dotted lines 83 in FIG. 3 as the center area of the webs pass the gear rim 70 and teeth 77. Once past the gear teeth 71 and rim 70, the resilient memory characteristics of the web causes them to spring back into the full line or free position of FIG. 3 so as to extend under the sides of the gear rim 70 and into the undercut area 72.

To enable the web 63 to deflect and slide past the gear, it is generally desirable that the thickness of the web not exceed the width of the space or operating clearance 84 (FIG. 3) between the case sides 20 or 21 and the gear rim 70 to enable it to slide past the rim. In this connection, some of the elastomers and nylons have performed well.

As for the spreader bars 82, they may be made out of plastic or wood and have a pointed tip to bits into the web sufficiently so they will not be dislodged during handling but yet will snap out of position when pressed against the gear teeth 71 (FIG. 12). The spacers may be retrieved from the gear case before the case is bolted or allowed to stay in the case and chewed by the gears as long as they are nonmetallic and frangible.

After both of the gear case halves 11 and 12 are mated together as shown in FIG. 1, they are bolted to the traction motor through the brackets 19. For purposes of making good sealing contact at the split line at the 3:00 o'clock and 9:00 o'clock positions, the sealing devices may be formed slightly longer then 180° so as to extend slightly beyond their retaining slots 34 and 43 (FIG. 11a). In other words, the ends 80 and 81 may project slightly beyond the retaining slots. Thus, when the gear case halves are bolted together, a compressive action is exerted on the sealing devices at the split-line 18 to further force the ends into compressive and/or interference contact with one another. Compressive contact of the sealing devices at the split lines of the gear case can also help force and retain the devices into their retaining slots 34 and 43.

In operation, as the bull gear 13 rotates, (FIG. 3), lubricant 85 in the bottom of the case is carried upwardly by the gear and is sprayed against the top wall 22 of the case. As shown by the dotted line arrows 87, the lubricant spray is then deflected downwardly along the gear rim sides 70 and the case sides 20 and 21. Lubricant traveling along the sides in the general direction of the arrows 87 is then collected in the trough area 66 formed between the sealing devices 55 and 56 and the sides of the case. It then flows downwardly following the arcuate shape of the web top surface 68 and the sidewalls of the gear case and drains as by the arrows 88 at the bottom to the reservoir area 85 of the case.

As noted hereinbefore and as shown in FIG. 3, the sealing device webs 63 extend axially inwardly to project under the side edges 70 of the gear rim. Any dripping directly down from the rim side, particularly at slower speeds or immediately after stopping, is then caught by the web. During running, because of centrifugal forces, gear lubricant which may collect near the hubs 32 and 41 generally is spun radially outwardly along the gear arm 69 as indicated by the arrow "Y" and recirculated downwardly along the sides of the case to the trough area 66 in the flow direction 87.

From the foregoing, it will be seen that the sealing devices 55 and 56 overhang and protect the gear hub 32 and wheel hub 41 shaft-like areas projecting through the side cutouts in the gear case. Moreover, since the sealing devices extend over a 360° circular area, they also act as a baffle to deflect lubricant spray coming from the meshing action of the pinion gear 16 and bull gear 13 in the vicinity of the arrows "W" (FIG. 1).

Another embodiment of the invention is shown in FIGS. 13–16. This embodiment differs from the embodiment shown in FIGS. 1–12 in that the sealing devices are made of a series of shingle-like members 89 and 90 which overlap one another to form the web or leaf effect. For purposes of illustration only, the wheel-side sealing device is shown at 55' (the motor side sealing device, not shown, may be constructed in the same manner). The overlapping concept enables the web to be made out of more rigid material but deflect as the sealing devices are moved past the gear 13 during installation of the gear case.

Specifically, each shingle or leaf 89 and 90 has an arcuate fan shape (FIG. 13) and includes an arcuately extending base 91, an outer leg 92, an inner leg 93 and a web or leaf 94. The outer legs 92 and inner legs 93 extend substantially radially outwardly away from the rotational axis 65 of the axle 13. Between them the legs define a slot or groove 95 (FIG. 14) which opens radially outwardly.

Figure 16:
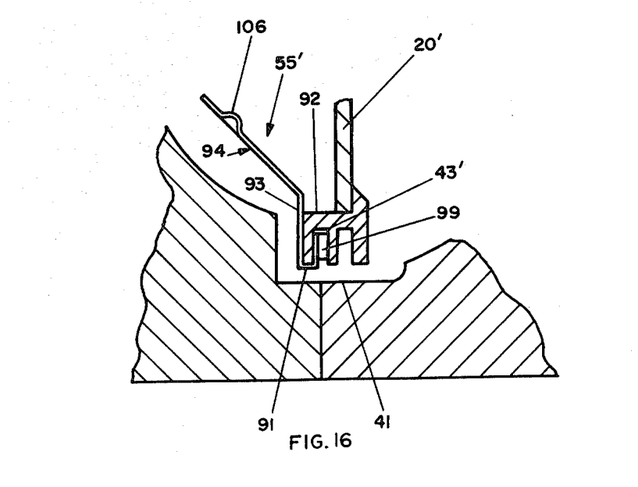
FIG. 16 is an exploded partial sectional view of the lubricant retaining device of FIG. 13 taken generally at the 12:00 o'clock position of the device showing it mounted in another form of gear case.

As would be viewed from the outside of the gear case looking inwardly (FIG. 13), the center shingle 89 overlaps the end shingles 90 as shown by the solid lines of its ends 97 which extend beyond the dotted line ends 98 of the shingles 90. The respective shingles 89 and 90 are held together by connectors 99 bridging between the shingles and secured by staples or the like 100 to the outer legs 92 of the base. Additional connectors 103 are used at the ends of the sealing device to aid in retaining the sealing devices in the gear case channel slot or groove 43' (FIG. 16).

Figure 13:
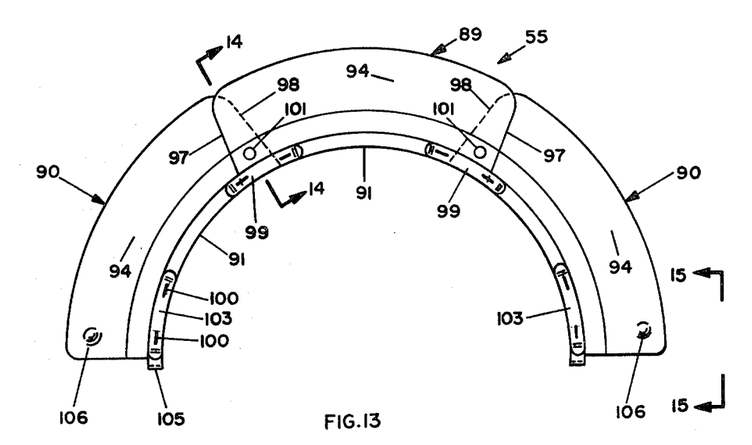
FIG. 13 is a side elevation of an alternate embodiment of the lubricant device which is made up of a series of leaves and viewed from the side thereof which faces toward the inside of the gear case.
Figure 14:
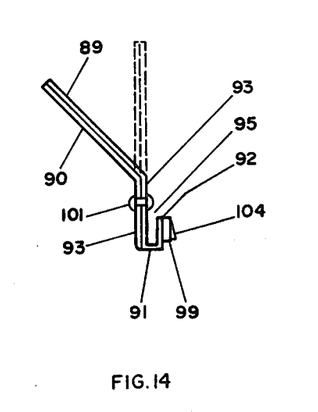
FIG. 14 is a sectional view taken along lines 14—14 of FIG. 13 showing how the leaves overlap.
Figure 15:
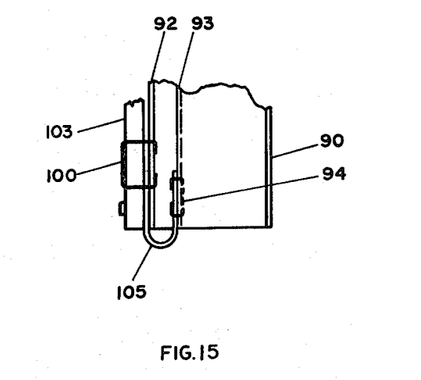
FIG. 15 is a sectional view of an anti-rotation means of the invention taken along lines 15—15 of FIG. 13.

Additional connection between the respective shingles 89 and 90 is provided by rivets or the like 101 extending through the overlapping inner legs 93 (FIGS. 13 and 14). The web portions 94 are free to move relative to one another and to separately deflect and collapse against the gear case sides 20 and 21 when the gear case is slid over a gear 13 as illustrated for the embodiment shown in FIGS. 11c and 12.

For purposes of mounting the wheel side sealing device 55' in a gear case, the outer legs 92 and the connectors 99 and 103 are inserted in a wheel side slot 43'. The connectors 99 and 103 may have a slight wedge patch 104 (FIG. 14) to aid in keeping the sealing devices held in the channel slots 43'. A dimple 106 (FIG. 16) may be used in the ends of the web of the end shingle 90 to enable a spreader bar such as 82 (FIG. 12) to nest therein.

As another feature, to keep the sealing devices from rotating in the event the gear or wheel hubs such as 41 rub on the base 91, an anti-rotation means is provided; this may take the form of a strap 105 (FIGS. 13 and 15) which bridges across the outer leg 92 and the inner leg 93 at the ends of the sealing device. The strap engages or straddles the exposed edges of the gear case holding channel such as 28 or 42 at the split line 18. Specifically the strap 105 may bridge across the outer wall 33 or inner wall 44 at the split line of the gear case, i.e. at the 3:00 o'clock and 9:00 o'clock positions. In some instances, the sealing device may be notched (not shown) at the ends to engage a pin or bar which extends into or across the ends of the slots 43' etc.

While the sealing elements have been shown to be semi-circular, they of course can be made somewhat less or greater then 180° and can be used as two (or more) pieces. In some cases, it may not be possible to provide a full 360° coverage by the sealing elements, but it is generally desirable that they in overhanging relation with respect to the rotatable surfaces and extend beyond the projection of the pinion gear spray pattern "W" to deflect lubricant splash or splatter directed toward the hub surfaces. Also, while the gear and wheel hubs have been shown and referred to as shaft areas, there may be other members or devices associated with the gear case and/or gearing includable in this terminology. Likewise, while the wheel hub, gear hub and axle are different components, they do, of course, have association with one another in the gear case assembly.

Preferably, as discussed above, it is desirable that the sealing elements provide as little contact as possible with the rotatable hubs within the confines or projection of the gear case since it has been found that gear lubricants collecting on the hub areas do not have a great tendency to run laterally under reasonable film thicknesses and will spin off tangentially under rotation of the hubs. However, if a rubbing scraping action is applied to the hubs, such as a rubbing seal, lubricant films which collect thereon are, in effect, pumped laterally or axially outwardly of the case under the lateral movement of the traction motor and/or axle. This is why the water and dirt exclusionary lip 74 of the wheel side sealing device 55 is located toward the outside of the gear case sides 20 and, preferably no sealing contact is made on the gear hub 32.

What is claim is:

1. A lubricant retaining device for a gear case having a series of sides adapted to contain a lubricant and a gear which gives off a lubricant spray pattern while moving, and wherein said case has an opening in a side thereof with a shaft area extending into proximity to said opening so as to be in association with said gear, and wherein said case has a holding means, said device comprising, locating means carried by said device for engagement with said holding means for aligning said device with respect to said opening in said gear case, and collecting means extending from said device adapted to project inwardly and generally arcuately to the inside of said gear case to gather lubricant within said case and restrict its flow through said opening, said means being positioned to extend in the path of said lubricant spray pattern toward said shaft area, said collecting means being deflectable toward a side of said case and between said gear and said case as said case is slid past said gear and wherein said collecting means has resilient memory characteristics which cause it to return to its original free position after it passes said gear.

2. A lubricant retaining device as claimed in claim 1 wherein said slot of said holding means is formed by a channel which extends substantially along said opening and opens toward said shaft area, and said locating means of said device has a leg which is adapted to nest in said channel.

3. A lubricant retaining device as claimed in claim 2 wherein said channel holding means is defined on one side by an inner wall, and said device has an outer leg and an inner leg which between them define a groove which faces radially away from said shaft with said legs being adapted to straddle said inner wall of said channel.

4. A lubricant retaining device as claimed in claim 3 wherein said collecting means extends inwardly from a point adjacent an inner leg of said device.

5. A lubricant retaining device as claimed in claim 3 wherein means are provided on said device which bridge between said outer leg and said inner leg and cooperate with said gear case to prevent rotation of said device when said shaft area and gear rotate.

6. A lubricant retaining device as claimed in claim 1 wherein said gear is spaced from a side of said gear case to provide operating clearance therebetween and wherein said collecting means is relatively thinner than the operating clearance between a side of said gear case and said gear.

7. A lubricant retaining device as claimed in claim 1 wherein said collecting means includes a number of individual leaves.

8. A lubricant retaining device as claimed in claim 7 wherein adjacent leaves are in overlapping relation with respect to one another.

9. A lubricant retaining device as claimed in claim 8 wherein said leaves overlap one another in shingle-like fashion and may deflect relative to one another.

10. A lubricant retaining device as claimed in claim 1 wherein said device includes a base, an outer leg connected to said base and adapted to extend into said holding means carried by said gear case, an inner leg connected to said base and adapted to extend generally to the inside of said case, and wherein said collecting means is connected to said inner leg and projects inwardly toward said gear.

11. A lubricant retaining device as claimed in claim 1 wherein a lip extends radially inwardly from said device toward said shaft area.

12. A lubricant retaining device as claimed in claim 1 wherein said device includes a least a pair of sections and each section extends only a partial distance adjacent said opening in said gear case.

13. A lubricant retaining device as claimed in claim 12 wherein each of said sections extends approximately 180°.

14. A lubricant retaining device as claimed in claim 1 wherein means are provided to aid in holding said collecting means toward a side of said case before said case is installed over said gear.

15. A device as claimed in claim 1 wherein said locating means has an arcuately extending base and said base has a spacer projection which overlies a portion of the shaft area.

16. A lubricant retaining device for a gear case having a series of sides adapted to contain a lubricant and a gear which gives off a lubricant spray pattern while moving, and wherein said case has an opening in a side thereof with a shaft area extending into proximity to said opening so as to be in association with said gear, and wherein said case has a holding means, said device comprising, locating means carried by said device for engagement with said holding means for aligning said device with respect to said opening in said gear case, and collecting means extending from said device adapted to project inwardly and generally arcuately to the inside of said gear case to gather lubricant within said case and restrict its flow through said opening, said means being positioned to extend in the path of said lubricant spray pattern toward said shaft area, said collecting means having an axially extending wall overhanging and somewhat facing said shaft area and the axis of rotation of said shaft, and wherein said wall tapers radially outwardly to a larger diameter in the nature of a truncated cone as it projects inwardly from a point adjacent a side of said case.

17. A lubricant retaining device for a gear case having a series of sides adapted to contain a lubricant, said case including matable members having edges which abut one another along a split-line to provide an enclosure, said case members having a complimentary pair of side walls with aligned oppositely facing recesses along adjacent edges which form a shaft surface receiving opening when said sections are assembled together, said case being adapted to enclose a gear which gives off a lubricant spray pattern when rotating, and wherein said gear in said case has a rim with a tooth area along the periphery thereof and an arm relatively thinner than said rim extending radially inwardly from said rim to provide an undercut area under said tooth area, and wherein a shaft surface extends through said opening and is rotatable in conjunction with said gear with a spray pattern from said gear being directed toward said shaft surface, said device comprising, collecting means adapted to extend inwardly from a point adjacent a side of said case and in overhanging relation wih respect to at least a portion of said shaft surface as the latter extends through said opening to the interior of said case, said collecting means being positioned between said shaft surface and said gear tooth area so as to extend in the path of said lubricant spray pattern from said gear toward shaft surface, said collecting means being deflectable toward a side wall of said case so as to slide between said rim and said side wall as said case and device are moved past said gear and then return to its free position when said case is in its operating position, and means carried by said device for locating said collecting means relative to said case.

18. A lubricant retaining device as claimed in claim 17 wherein a pair of devices are mounted in a matable member of said gear case with one device adjacent each side of said case and spreader means are provided to hold opposed ends of said devices against their respective sides.

19. A device for a gear case having a series of sides adapted to contain a lubricant, said case having an opening in a side thereof through which a shaft is adapted to extend, said shaft being associated with a gear and a wheel mounted on an axle and having its axis of rotation disposed generally horizontally with said axle, said device including, collecting means including a web which is adapted to extend in a generally circumferential direction in generally overhanging relation to said shaft and to be spaced from said shaft to allow movement of said shaft relative to said web, said web extending in an axial direction toward the inside of said gear case and toward said gear and having an underside which faces toward said axis of rotation and said shaft as it extends inwardly toward the inside of said case and away from a side of said gear case, said web including a pair of ends to enable said device to be inserted in overhanging relation with respect to said shaft without removing said gear or said wheel from said axle, and locating means secured to said web for attaching said web to said gear case in proximity to said opening in said gear case and generally spaced away from said shaft, said means including a groove defined between spaced apart leg members and shaped to receive and nest with a complimentary portion carried by a gear case side to locate said device relative to said case.

* * * * *